US012071923B2

United States Patent
Huth et al.

(10) Patent No.: US 12,071,923 B2
(45) Date of Patent: Aug. 27, 2024

(54) ROTOR BLADE SEGMENTS SECURED TOGETHER VIA INTERNAL SUPPORT STRUCTURES THAT DEFINE A VARIABLE SIZE GAP THEREBETWEEN

(71) Applicant: General Electric Company, Schenectady, NY (US)

(72) Inventors: Scott Jacob Huth, Greenville, SC (US); Andrew Mitchell Rodwell, Greenville, SC (US); Thomas Merzhaeuser, Munich (DE)

(73) Assignee: GE Infrastructure Technology LLC, Greenville, SC (US)

( * ) Notice: Subject to any disclaimer, the term of this patent is extended or adjusted under 35 U.S.C. 154(b) by 383 days.

(21) Appl. No.: 17/415,924

(22) PCT Filed: Dec. 20, 2018

(86) PCT No.: PCT/US2018/066773
§ 371 (c)(1),
(2) Date: Jun. 18, 2021

(87) PCT Pub. No.: WO2020/131066
PCT Pub. Date: Jun. 25, 2020

(65) Prior Publication Data
US 2022/0082079 A1    Mar. 17, 2022

(51) Int. Cl.
*F03D 1/06*    (2006.01)
(52) U.S. Cl.
CPC ...... *F03D 1/0675* (2013.01); *F05B 2230/604* (2013.01); *F05B 2240/302* (2013.01)
(58) Field of Classification Search
CPC .............. F03D 1/0675; F05B 2230/604; F05B 2240/302; Y02E 10/72; Y02P 70/50
See application file for complete search history.

(56) References Cited

U.S. PATENT DOCUMENTS

| 851,196 A | 4/1907 | Bevans et al. |
| 4,474,536 A | 10/1984 | Gougeon et al. |

(Continued)

FOREIGN PATENT DOCUMENTS

| CN | 105298739 A | 2/2016 |
| EP | 2186622 A1 | 5/2010 |

(Continued)

OTHER PUBLICATIONS

English translation of the foreign Office Action corresponding to JP application No. JP2021-534666, 7 pages.

(Continued)

*Primary Examiner* — Dapinder Singh
(74) *Attorney, Agent, or Firm* — Dority & Manning, P.A.

(57) ABSTRACT

A rotor blade for a wind turbine including a first blade segment and a second blade segment extending in opposite directions from a chord-wise joint. Each of the first and second blade segments include one or more shell members and an internal support structure. The internal support structure of the first blade segment includes a beam structure extending between a receiving end and a second end. The internal support structure of the second blade segment includes a receiving section that receives the receiving end of the beam structure of the first blade segment. The rotor blade further includes one or more connection locations where the first and second blade segments are secured together. Moreover, when the beam structure is received within the receiving section, a gap including a varying thickness is defined and maintained between the beam structure and the receiving section in a span-wise direction of the rotor blade.

12 Claims, 8 Drawing Sheets

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 5,281,454 A | 1/1994 | Hanson | |
| 6,843,953 B2 | 1/2005 | Filsinger et al. | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,177,514 B2 * | 5/2012 | Hibbard | F03D 1/0675 416/226 |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,669,589 B2 | 6/2017 | Zamora Rodriguez et al. | |
| 10,900,469 B2 * | 1/2021 | Merzhaeuser | F03D 1/0675 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 * | 6/2010 | Baehmann | B29C 66/1142 156/423 |
| 2010/0215494 A1 | 8/2010 | Bech et al. | |
| 2010/0304170 A1 | 12/2010 | Frederiksen | |
| 2011/0020126 A1 * | 1/2011 | Glenn | F03D 80/00 416/223 A |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 * | 4/2011 | Hancock | F03D 1/0675 29/889.7 |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 * | 4/2012 | Christenson | F03D 13/10 415/1 |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0152839 A1 | 6/2015 | Busbey et al. | |
| 2015/0204200 A1 | 7/2015 | Eyb et al. | |
| 2015/0369211 A1 * | 12/2015 | Merzhaeuser | F03D 80/30 416/61 |
| 2017/0145986 A1 | 5/2017 | Baehmann et al. | |
| 2018/0223796 A1 | 8/2018 | Yarbrough et al. | |

FOREIGN PATENT DOCUMENTS

| | | |
|---|---|---|
| EP | 2264310 A2 | 12/2010 |
| EP | 2288807 A2 | 3/2011 |
| EP | 3144526 A1 | 3/2017 |
| FR | 2710871 A1 | 4/1995 |
| GB | 2477847 A | 8/2011 |
| KR | 20100115139 | 10/2010 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

OTHER PUBLICATIONS

International Search Report & Opinion Corresponding to PCT/US2018/066773 dated Sep. 6, 2019.

Chinese Office Action with Translation, dated Sep. 15, 2203.

* cited by examiner

ROTOR BLADE SEGMENTS SECURED TOGETHER VIA INTERNAL SUPPORT STRUCTURES THAT DEFINE A VARIABLE SIZE GAP THEREBETWEEN

FIELD

The present disclosure relates generally to wind turbines, and more particularly to rotor blades having blade segments secured together via internal support structures that define a variable-size gap therebetween.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance, and strength of the rotor blade, the body shell is typically reinforced using one or more structural components (e.g., opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

Various rotor blades may be divided into two or more segments and assembled to form a completed rotor blade. Each segment of a segmented rotor blade generally includes suction and pressure side shells and one or more structural components. Such segments and their respective components are typically assembled at joints between segments. For instance, a first blade segment may include a beam structure that can be inserted into a receiving section of a second blade segment. In such rotor blades, the beam structure and the receiving section may be coupled together at one or more connection locations, e.g. via pins, bolts, adhesives, fasteners, or similar.

In addition, the beam structure and the receiving section generally have different stiffnesses that may lead to distinct deformations of the two structures when the rotor blade is under loading. As such, the differing properties of the beam structure and the receiving section may cause direct contact of the beam structure with the receiving section, thereby leading to indefinite loading on the components, particularly at the connection locations.

Accordingly, the present disclosure is directed to an improved rotor blade having blade segments secured together via the beam structure and the receiving section that define and maintain a variable-size gap therebetween so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments include one or more shell members and an internal support structure. The internal support structure of the first blade segment includes a beam structure extending between a receiving end and a second end. The internal support structure of the second blade segment includes a receiving section that receives the receiving end of the beam structure of the first blade segment. The rotor blade further includes one or more connection locations where the first and second blade segments are secured together. Moreover, when the beam structure is received within the receiving section, a gap including a varying thickness is defined and maintained between the beam structure and the receiving section in a span-wise direction of the rotor blade.

In one embodiment, the varying thickness may be at a minimum at the connection location(s). In one such embodiment, the connection location(s) may include one or more first pin joints at the receiving end of the beam structure and one or more second pin joints positioned along the beam structure toward the second end. Further, the first pin joint(s) may include one or more span-wise extending pin joints. Additionally, the second pin joint(s) may include a chord-wise extending pin joint. In a further embodiment, the varying thickness may be at a maximum at a point between the first pin joint(s) and the second pin joint(s). In several embodiments, the connection location(s) may include at least one of a pin joint, a bolt joint, a screw, a rivet, a weld, or an adhesive. In further embodiments, the varying thickness may define a linear transition and/or a non-linear transition between the maximum varying thickness and the minimum varying thickness.

In another embodiment, a cross-section of the beam structure may vary so as to define the varying thickness of the gap. In a further embodiment, the beam structure may include one or more spar caps coupled to an inner surface of the shell member(s) of the first blade segment. As such, a thickness of the spar cap(s) may be at a minimum at the connection location(s). In another embodiment, a cross-section of the receiving section may vary so as to define the varying thickness of the gap. In one embodiment, the cross-section of the receiving section may taper toward a root end of the second blade segment opposite the receiving section. For example, receiving section may taper from the chord-wise joint toward a root end of the receiving section. In some embodiments, the rotor blade may further include a filler material at least partially filling the gap between the beam structure and the receiving section.

In yet another aspect, the present disclosure is directed to a method of manufacturing a segmented rotor blade of a wind turbine. The method includes providing a first blade segment having a beam structure extending lengthwise from a receiving end thereof. Another step of the method includes providing a second blade segment having a receiving section configured to receive the beam structure. In one step, the method includes forming an inner surface of the receiving section and/or an outer surface of the beam structure with a varying cross-section. A further step includes, inserting the receiving end of the beam structure of the first blade segment into the receiving section of the second blade segment. Moreover, the outer surface of the beam structure and the inner surface of the receiving section define a gap therebetween having a varying thickness in the span-wise direction of the rotor blade. A further step of the method includes securing the first and second blade segments together at one or more connection locations such that the varying thickness of the gap is maintained. It should be understood that the method may further include any of the additional features as described herein.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
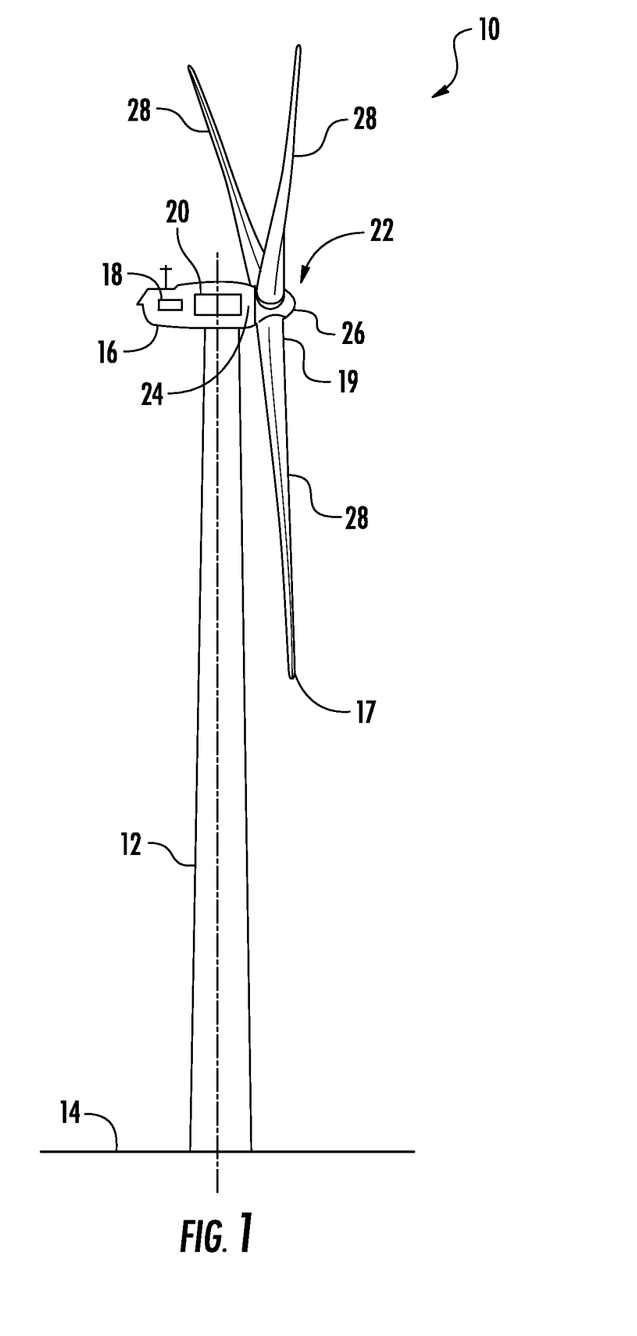
FIG. 1 illustrates a perspective view of one embodiment of a wind turbine according to the present disclosure.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
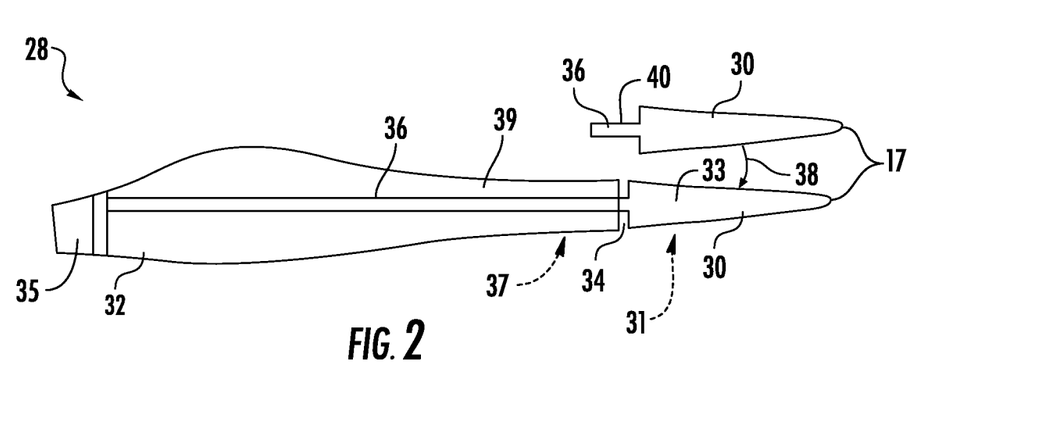
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include one or more shell members and an internal support structure 36. In certain embodiments, the one or more shell members of the first blade segment 30 may include a pressure side shell member 31 and a suction side shell member 33. Further as shown, the one or more shell members of the second blade segment 32 may include a pressure side shell member 37 and a suction side shell member 39. However, in other embodiments, one or both of the blade segments 30, 32 may include one shell member with a pressure and suction side. As such, the pressure side shell member(s) 31, 37 and/or suction side shell member(s) 33, 39 described herein may be a pressure side or suction side of a single shell member, respectively. The first blade segment 30 and the second blade segment 32 may be connected by at least an internal beam structure 40 of the internal support structure 36 of the first blade segment 30 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal beam structure 40 into the second blade segment 32. For instance, the beam structure 40 of the first blade segment 30 may be inserted into the support structure 36 of the second blade segment 32. In addition, as shown, the support structure 36 of the second blade segment 32 may extend lengthwise for connecting with a blade root section 35 of the rotor blade 28 and with the beam structure 40 of the first blade segment 30 (which is shown in more detail in FIGS. 5 and 6).

Figure 3:
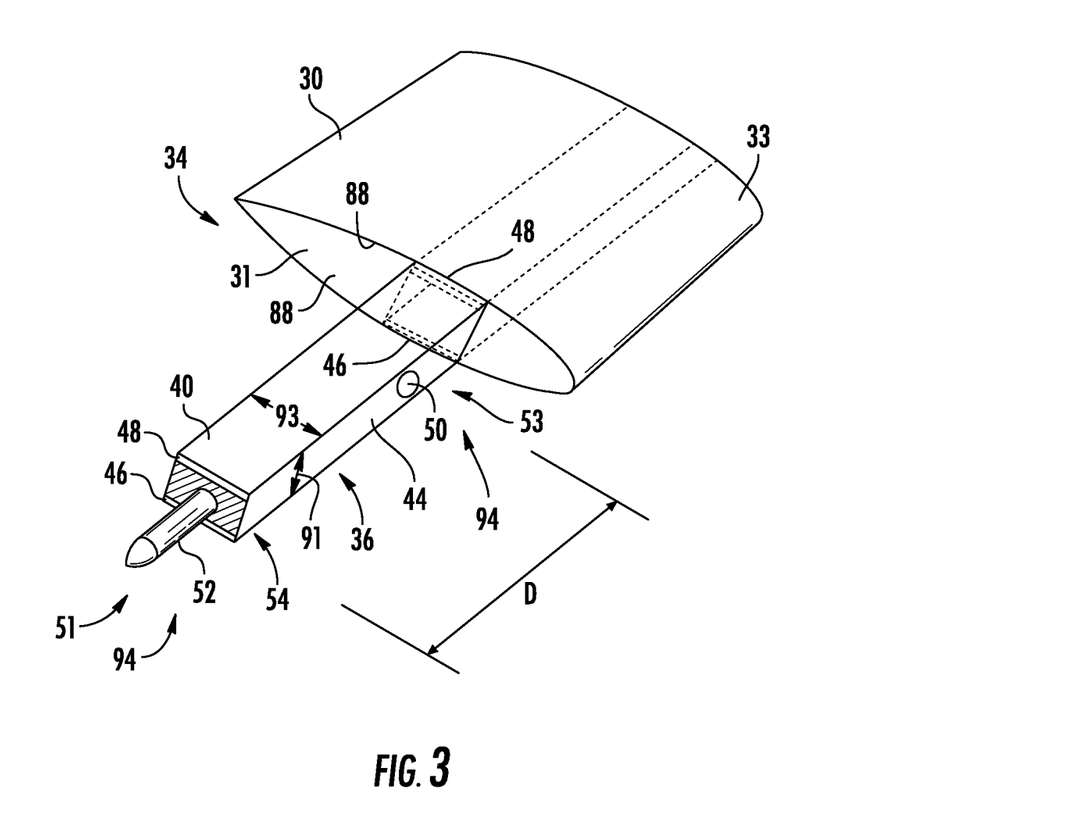
FIG. 3 illustrates a perspective view of one embodiment of a section of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms at least a part of a shear web 44 connected with a pressure side spar cap 46 and a suction side spar cap 48. Further, as shown, the beam structure 40 may form a part of the first blade segment 30 having an extension protruding from an internal section within the shell members 31, 30, thereby forming an extending spar section. Further, the beam structure 40 may be coupled to an inner surface 88 of the pressure side shell member 31 and/or the suction side shell member 33 of the first blade segment 30. For instance, the pressure side spar cap 46 may be coupled to the inner surface 88 of the pressure side shell member 31 using an adhesive. Similarly, the suction side spar cap 48 may be coupled to the inner surface 88 of the suction side shell member 33 using an adhesive.

Figure 4:
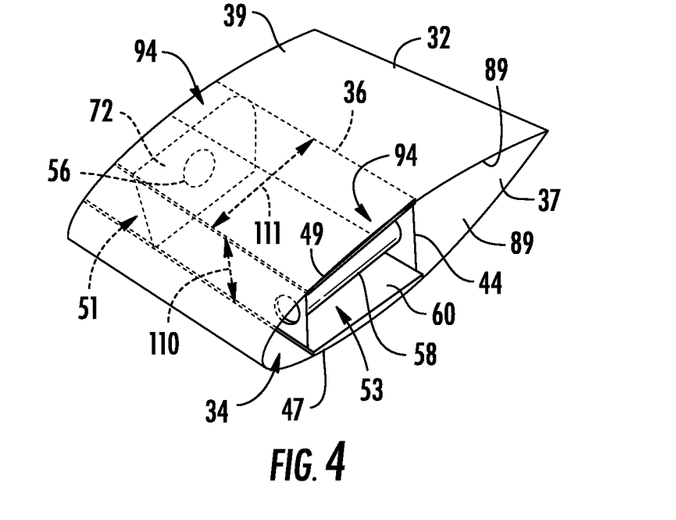
FIG. 4 illustrates a perspective view of one embodiment of a section of the second blade segment at the chord-wise joint according to the present disclosure.

Referring now to FIG. 4, a perspective view of a section of the second blade segment 32 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include a pressure side spar cap 47, a suction side spar cap 49, and one or more shear webs 44 extending therebetween for connecting with the beam structure 40 of the first blade segment 30. Further, as shown, the receiving section 60 may be coupled to an inner surface 89 of the pressure side shell member 37 and/or the suction side shell member 39 of the second blade segment 32. For instance, the pressure side spar cap 47 may be coupled to the inner surface 89 of the pressure side shell member 37 using an adhesive. Similarly, the suction side spar cap 49 may be coupled to the inner surface 89 of the suction side shell member 39 using an adhesive.

Referring generally to FIGS. 3-6, the first blade segment 30 may be joined to the second blade segment 32 at one or more connection locations 94. More specifically, as shown particularly in FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. More specifically, as shown, the first blade segment 30 and second blade segment 32 may be secured together at one or more connection location(s) 94. In several embodiments, the connection location(s) 94 may include a pin joint, a bolt joint, a screw, a rivet, a weld, or an adhesive.

More specifically, as shown generally in the figures, the connection location(s) 94 may include one or more pin joints. Though the connection location(s) 94 may be described generally as first and second pin joint(s) 51, 53, it should be appreciated that in other embodiments one or more of the connection locations 94 may include any of the preceding or further structure capable of coupling the beam structure 40 and receiving section 60 together at the connection location(s) 94. More specifically, as show, the one or more pin joints may include one or more first pin joints 51, e.g. from a receiving end 54 of the beam structure 40, and one or more second pin joints 53 spaced apart from the first pin joint(s) 51. The first pin joint(s) 51 may include at least one pin tube 52 located on the receiving end 54 of the beam structure 40 that can be in a tight interference fit with pin joint slot 56 of the receiving section 60, e.g. within chord-wise member 72. Thus, as shown, the pin tube 52 may be oriented in a span-wise direction, i.e. along the span or length of the rotor blade 28 which is defined along an axis that extends from the blade root to the blade tip of the rotor blade 28 and may extend through the pin joint slot 56.

Figure 5:
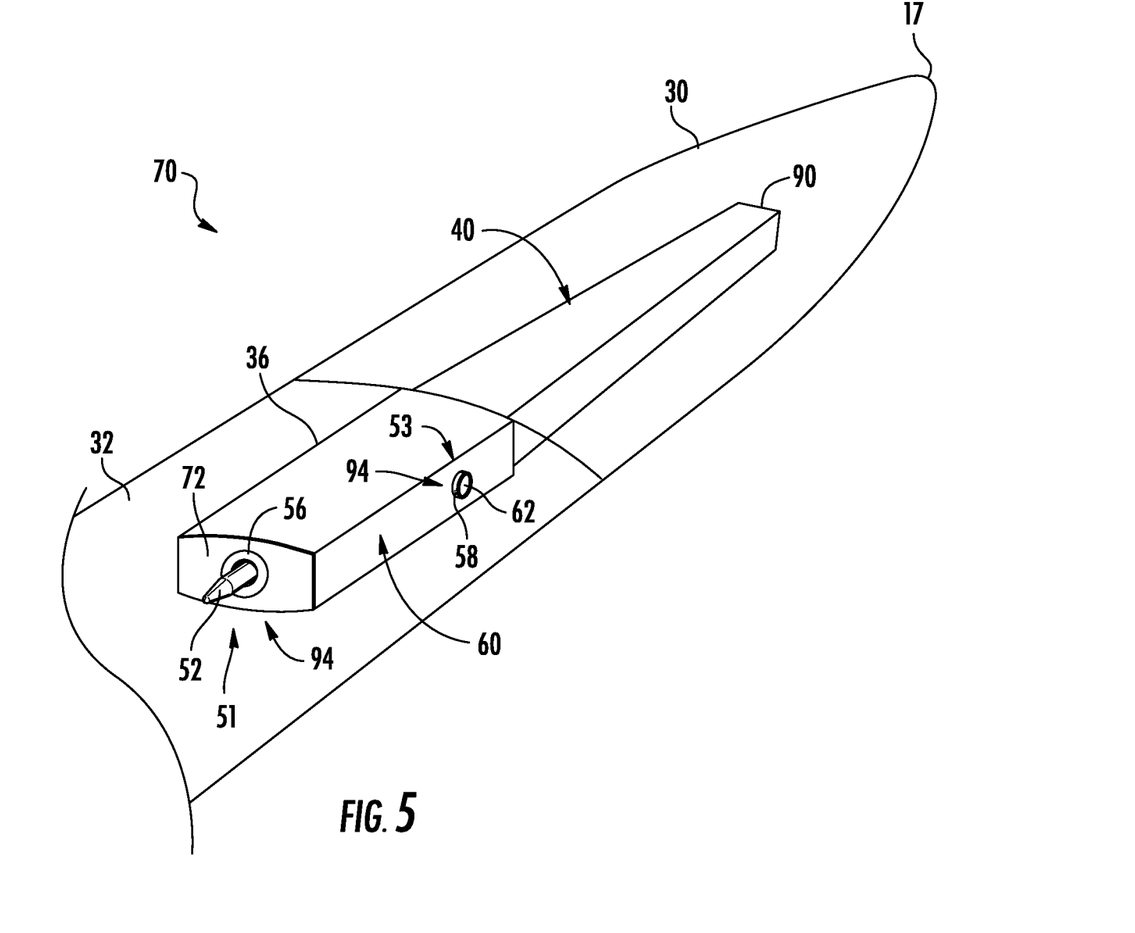
FIG. 5 illustrates a perspective view of one embodiment of an assembly of the rotor blade of the wind turbine having the first blade segment joined with the second blade segment according to the present disclosure.
Figure 6:
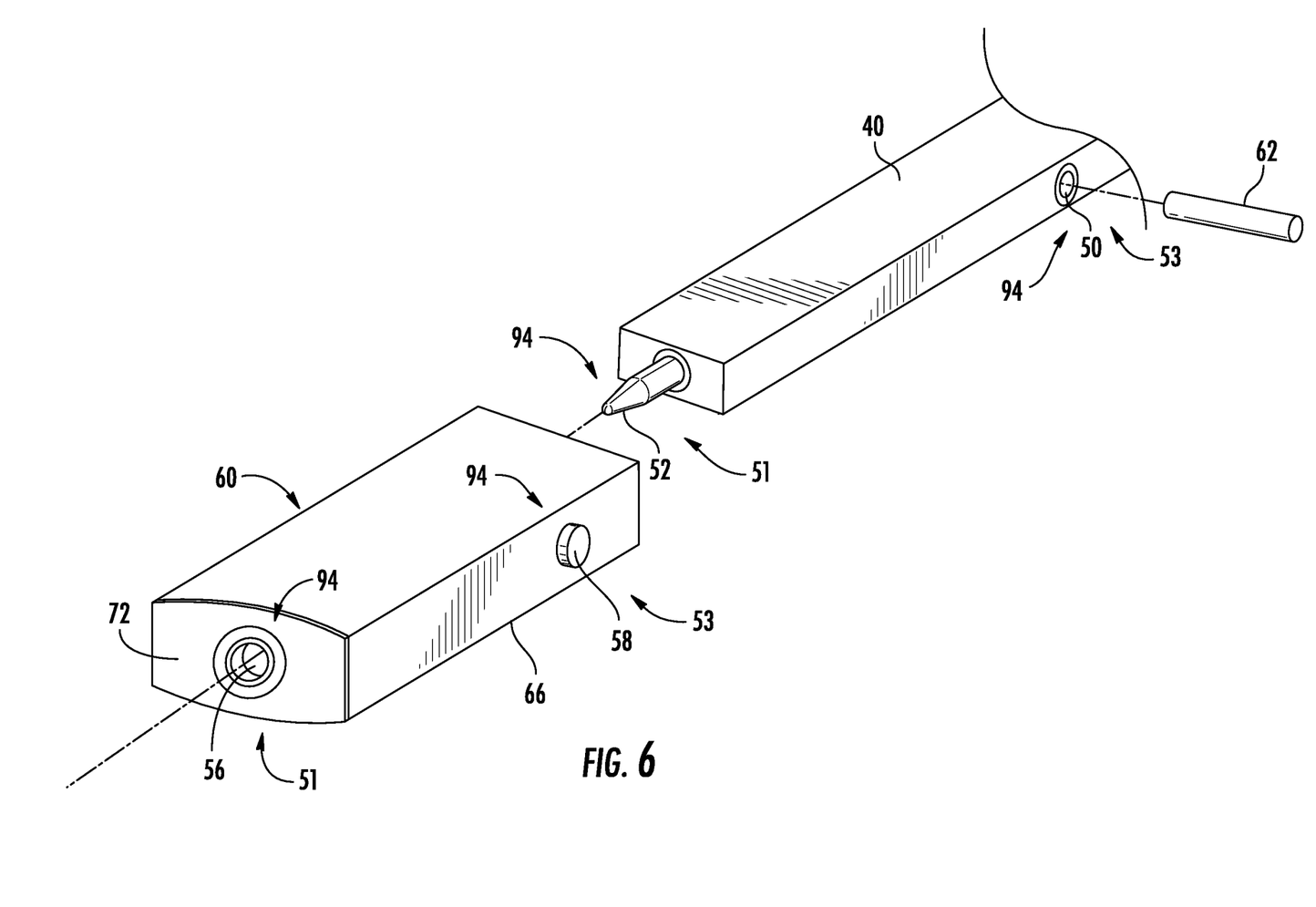
FIG. 6 illustrates an exploded perspective view of one embodiment of the multiple supporting structures of the assembly of the rotor blade of the wind turbine according to the present disclosure.

Referring particularly to FIGS. 5 and 6, the second pin joint(s) 53 may be formed via pin joint slot 50 of the beam structure 40, pin joint slot 58 of the receiving section 60, and a corresponding pin tube 62 that extends through the aligned pin joint slots 50, 58 in a chord-wise direction, i.e. along a chord of the rotor blade 28 which is defined along an axis that extends from the leading edge to the trailing edge of the rotor blade 28.

It is to be noted that the pin tube 52 located at the receiving end 54 of the beam structure 40 may be separated span-wise with the pin joint slot 50 by an optimal distance D. This optimal distance D may be such that the chord-wise joint 34 is able to withstand substantial bending moments caused due to shear loads acting on the chord-wise joint 34.

Referring still to FIG. 5, in certain embodiments, at least a portion of the beam structure 40 may taper between the receiving end 54 and a second end 90 opposite the receiving end 54. For example, the internal section of the beam structure 40 may taper between the chord-wise joint 34 and the second end 90. More particularly, the pressure side spar cap 46, the suction side spar cap 48, or both may taper between the chord-wise joint 34 and the second end 90. It should be appreciated that the beam structure 40 may taper with the first blade segment 30 toward the blade tip 17. In one embodiment, the internal section of the beam structure 40 may taper while the extension may have a uniform width and/or height. However, in other embodiments, the beam structure 40 may taper along the entire length between the receiving end 54 and the second end 90.

Figure 7:
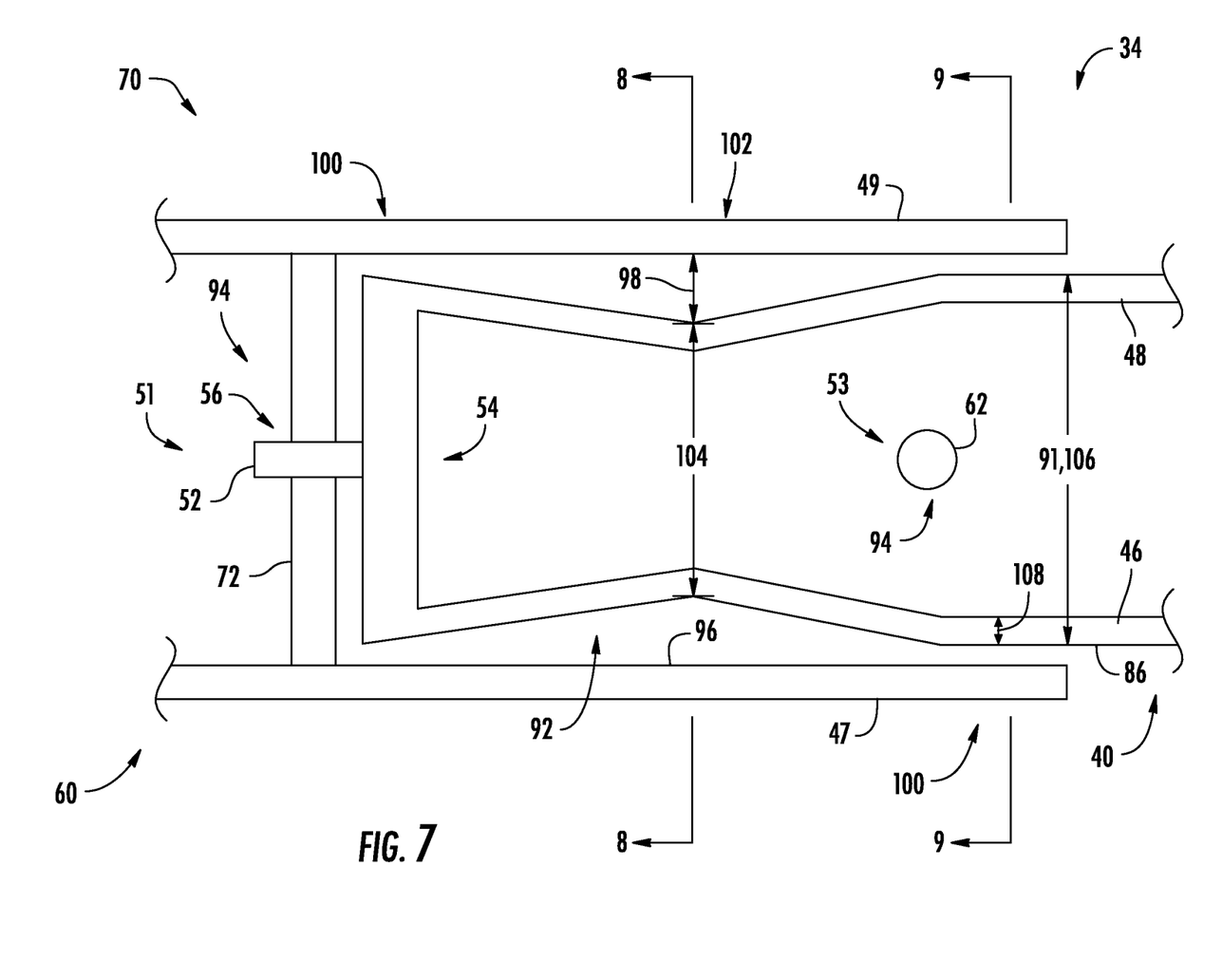
FIG. 7 illustrates a cross-sectional view of one embodiment of an assembly of a beam structure and a receiving section at the chord-wise joint according to the present disclosure, particularly illustrating a gap between the beam structure and the receiving section having a varying thickness.

Referring now to FIG. 7, a cross-sectional view of one embodiment of the beam structure 40 received within the receiving section 60 at the chord-wise joint 34 is illustrated according to the present disclosure. Further, as shown, a gap 92 is provided between the beam structure 40 and the receiving section 60. More specifically, as shown, the gap 92 is defined between an outer surface 86 of the beam structure 40 and an inner surface 96 of the receiving section 60 and has a varying thickness 98 in the span-wise direction of the rotor blade 28. As such, when the beam structure 40 is inserted within the receiving section 60 and the components are secured together, the variable-size gap 92 is maintained between the beam structure 40 and the receiving section 60 in the span-wise direction of the rotor blade 28.

Referring still to FIG. 7, the varying thickness 98 may be at a minimum (as shown at 100) at the connection location(s) 94. In certain embodiments, it should be appreciated that the relative deflections between the beam structure 40 and receiving section 60 may be at a minimum, such as approximately zero, at the connection location(s) 94. As such, the gap 92 between the beam structure 40 and receiving section 60 may be less at the connection location(s) 94 as relative deflections between the beam structure 40 and receiving section 60 is less at such locations. Further, in certain embodiments, the varying thickness 98 may be approximately the same at the connection locations 94, such as at first pin joint(s) 51 and the second pin joint(s) 53. For instance, the varying thickness 98 at the second pin joint(s) 53 may be between 90% and 110% of the varying thickness 98 at the first pin joint(s) 51. Though, in other embodiments, it should be appreciated that the varying thickness 98 may be different at the connection locations 94.

Still referring to FIG. 7, the varying thickness 98 may be at a maximum (as shown at 102) at a location between the connection location(s) 94, e.g., between the first pin joint(s) 51 and the second pin joint(s) 53. As such, the varying thickness 98 may be larger between the connection locations 94 to accommodate for relative deflections between the beam structure 40 and the receiving section 60. For example, in certain embodiments, the maximum thickness 102 of the gap 92 may be positioned between 25% and 75% of the length between the first pin joint(s) 51 and the second pin joint(s) 53. For instance, the maximum thickness 102 may be located approximately half way between the first pin joint(s) 51 and the second pin joint(s) 53 (e.g., between 45% and 55% of the length). In addition, in one embodiment, it should be appreciated that the maximum thickness 102 may be positioned to coincide with the greatest relative deflection between the beam structure 40 and the receiving section 60. Additionally, as shown, the varying thickness 98 of the gap 92 may define, at least in part, a linear transition between the maximum thickness 102 and the minimum thickness 100. Though, in other embodiments, the varying thickness 98 of the gap 92 may define, at least in part, a non-linear transition between the maximum thickness 102 and the minimum thickness 100 (see, e.g., FIG. 10).

In addition, as shown in FIG. 7, a thickness of the beam structure 40 may vary along a length thereof so as to define the varying thickness 98 of the gap 92. For instance, as shown, the beam structure 40 may define a maximum height and/or maximum width at the connection location(s) 94. Particularly, as illustrated, a height 91 of the beam structure 40 may be at a maximum at one or both of the first pin joint(s) 51 and/or the second pin joint(s) 53. Similarly, a width 93 (see, e.g., FIG. 3) of the beam structure 40 may be at a maximum at the first pin joint(s) 51 and/or the second pin joint(s) 53. It should be appreciated that the beam structure 40 may define a minimum height and/or minimum width between the first pin joint(s) 51 and the second pin joint(s) 53 in order to define the maximum thickness 102 of the gap 92 positioned between the connection locations 94.

It should be appreciated that, in certain embodiments, the peak stress of the beam structure 40 may occur at or near the connection location(s) 94, such as the second pin joint(s) 53, or more particularly, at the chord-wise extending pin joint 62, the pin joint slot 50, and/or the chord-wise pin joint slot 58. As such, by increasing the height of the beam structure 40 at the connection location(s) 94, such as at the second pin joint(s) 53, the moment of inertia of the beam structure 40 may be maintained. For instance, less material may be required to form the beam structure 40 without reducing the moment of inertia. As such, the beam structure 40 may define a first height 104 at the position of the maximum thickness 102 of the gap 92 and a second height 106 at the position of the minimum thickness 100 of the gap 92. Further, the second height 106 may be greater than the first height 104. It should be appreciated that the height of the beam structure 40 may transition between the first height 104 to the second height 106 at one or both of the connection locations 94.

Figure 8:
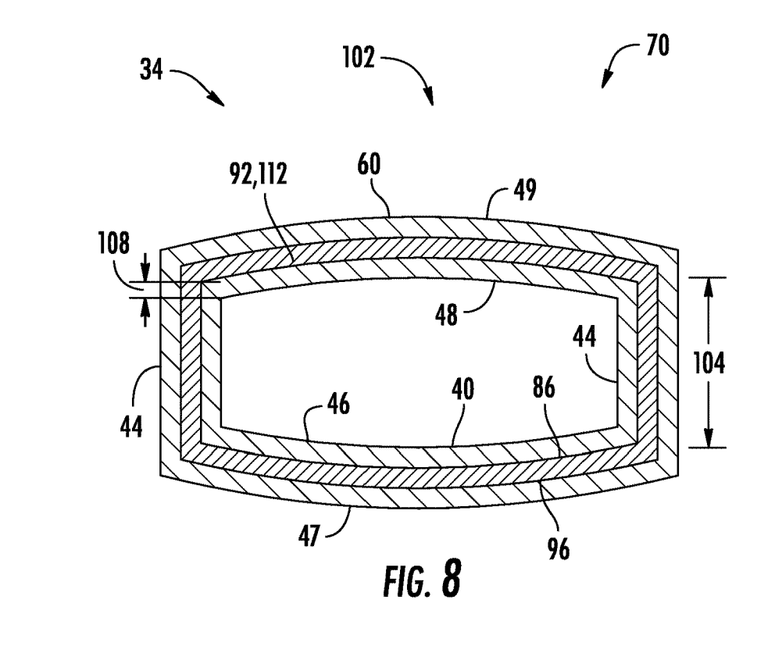
FIG. 8 illustrates a chord-wise cross-sectional view of one embodiment of the assembly of the rotor blade according to the present disclosure, particularly illustrating a gap between the beam structure and the receiving section having a maximum thickness.
Figure 9:
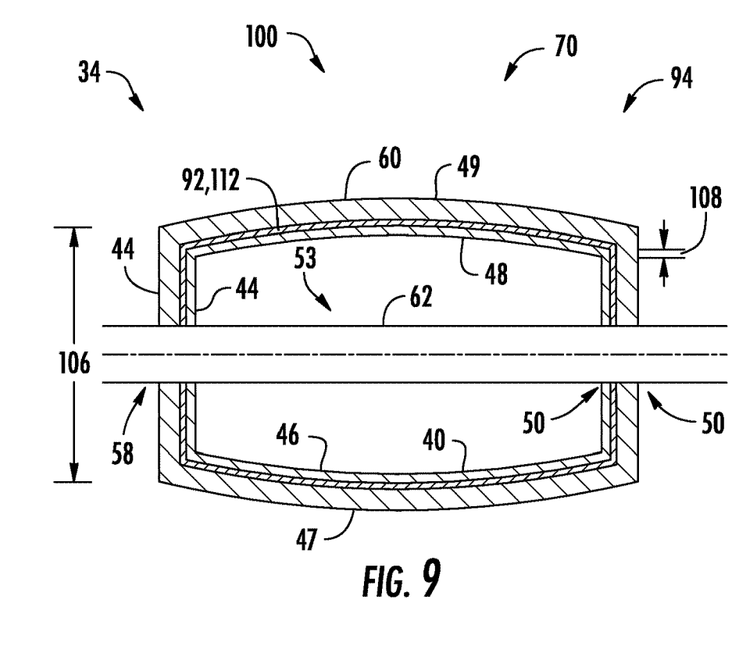
FIG. 9 illustrates a chord-wise cross-sectional view of another embodiment of the assembly of the rotor blade according to the present disclosure, particularly illustrating a gap between the beam structure and the receiving section having a minimum thickness.

Referring now to FIGS. 8 and 9, multiple cross-sectional views of the beam structure 40 received within the receiving section 60 at the chord-wise joint 34 so as to define gap 92 therebetween is illustrated according to the present disclosure. Particularly, FIG. 8 illustrates a cross-sectional view taken along the chord of the beam structure 40 and the receiving section 60 at the maximum thickness 102 of the gap 92 (see section line 8-8 in FIG. 7). FIG. 9 illustrates a cross-sectional view taken along the chord of the beam structure 40 and the receiving section 60 at the minimum thickness 100 of the gap 92 (see section line 9-9 in FIG. 7).

Thus, as shown, the spar cap(s) 46, 48 of the beam structure 40 define a thickness 108 (see also FIG. 7), which has a minimum at the connection location(s) 94, corresponding to the position of the minimum thickness 100 of the gap 92, as shown in FIG. 9. For example, the taller second height 106 of the beam structure 40 at the connection location(s) 94 may allow for thinner spar cap(s) 46, 48 while maintaining the moment of inertia at the connection location(s) 94. Further, the thickness 108 of the spar cap(s) 46, 48 may be at a maximum between the connection locations 94. For instance, the thickness 108 of the spar cap(s) 46, 48 may be at a maximum at the position of the minimum thickness 100 of the gap 92, as shown in FIG. 8. For example, the shorter first height 104 of the beam structure at the position of the minimum thickness 100 may require thicker spar cap(s) 46, 48 to maintain the moment of inertia at the position of the maximum thickness 102 of the gap 92.

Though the thickness 108 of the opposing spar caps 46, 48 of the beam structure 40 are illustrated as the same, respectively, in FIGS. 8, and 9, it should be recognized that the thickness 108 of one of the spar caps 46, 48 may be constant along the span while the thickness 108 of the other spar cap 46, 48 varies along the span. It should be appreciated that spar caps 46, 48 with a thinner thickness 108 at the connection locations 94 may allow for lighter and/or more cost effective spar caps 46, 48.

Referring still to FIGS. 8 and 9, in some embodiments, the rotor blade 28 may further include a filler material 112 at least partially filling the gap 92 between the beam structure 40 and the receiving section 60. Moreover, the filler material(s) 112 may be secured to the outer surface 86 of the beam structure 40 and/or the inner surface 96 of the receiving section 60, such as via an adhesive. It should also be appreciated that the filler material(s) 112 may also generally be contoured to the shape of the outer surface 86 of the beam structure 40 and/or the inner surface 96 of receiving section 60. For instance, a thickness of the filler material(s) 112 may generally change along the chord between the leading edge and trailing edge. Further, the thickness of the filler material(s) 112 may generally change along the span of the chord-wise joint 34.

Figure 10:
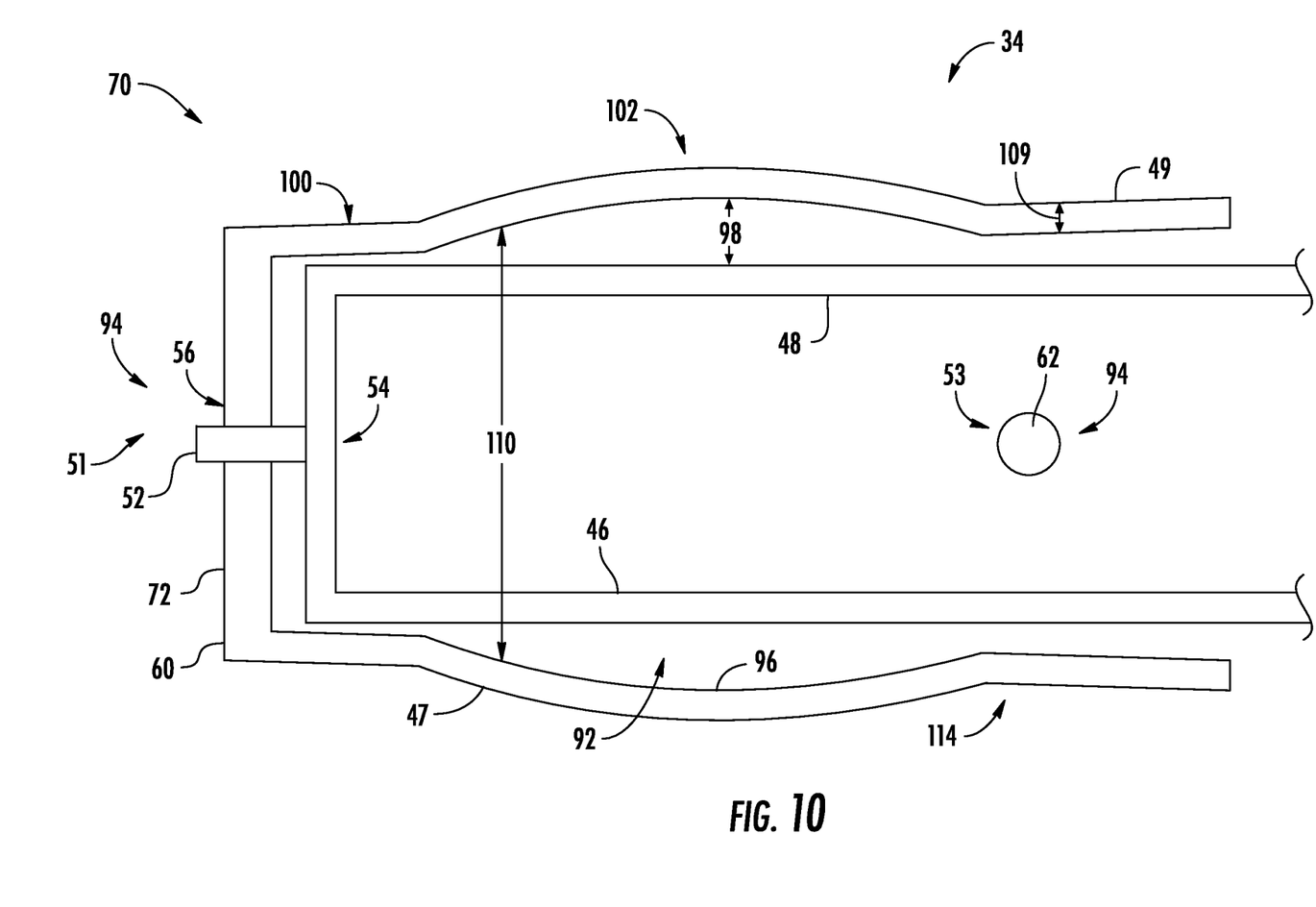
FIG. 10 illustrates a cross-sectional view of another embodiment of the assembly of the beam structure and the receiving section at the chord-wise joint according to the present disclosure, particularly illustrating a variable-size gap between the beam structure and the receiving section; and, FIG. 11 illustrates a flow chart of one embodiment of a method of assembling a segmented rotor blade of a wind turbine according to the present disclosure.

Referring now to FIG. 10, another embodiment of the assembly 70 of the beam structure 40 and the receiving section 60 at the chord-wise joint 34 is illustrated according to the present disclosure. Particularly, FIG. 10 illustrates a cross-section of the assembly 70 along the span where the cross-section of the receiving section 60 varies so as to define the varying thickness 98 of the gap 92, whereas the cross-section of the beam structure 40 remains approximately constant along the extension. For example, as shown, the receiving section 60 may define a minimum internal height and/or minimal internal width at the connection location(s) 94. Particularly, as illustrated, an internal height 110 of the receiving section 60 may be at a minimum at one or both of the first pin joint(s) 51 and/or the second pin joint(s) 53. Similarly, an internal width 111 (see, e.g., FIG. 4) of the beam structure 40 may be at a minimum at the first pin joint(s) 51 and/or the second pin joint(s) 53. In one embodiment, the receiving section 60 may define the minimum internal height and/or minimum internal width at both the first pin joint(s) 51 and the second pin joint(s) 53. As such, the minimum thickness 100 of the gap 92 may be positioned at the minimum internal height and/or minimum internal width, e.g., at the connection location(s) 94.

Additionally, the internal height 110 and/or internal width 111 of the receiving section 60 may be at a maximum between the connection locations 94. For instance, the maximum internal height and/or maximum internal width of the receiving section 60 may define the position of the maximum thickness 102 of the gap 92. Though the thickness of the spar caps 47, 49 of the receiving section 60 are illustrated as approximately constant in FIG. 10, in additional or alternative embodiments, a thickness 109 of at least one of the spar caps 47, 49 may be at a minimum at the position of the maximum thickness 102 of the gap 92. Further, the thickness 109 of at least one of the spar caps 47, 49 may be at maximum at the connection location(s) 94 in order to define the minimum thickness 100 of the gap 92.

In certain embodiments, as illustrated in FIG. 10, the internal height 110 of the receiving section 60 may be larger at one the connection locations 94, such as the first pin joint(s) 51 or the second pin joint(s) 53. For example, the cross-section of the receiving section 60 may generally taper from the chord-wise joint 34 toward the blade root section 35 (see FIG. 2) of the receiving section 60. As such, the assembly 70 may define a third thickness 114 at the second pin joint 53 greater than the minimum thickness 100 at the first pin joint 51 but less than the maximum thickness 102 between the pin joints 51, 53. It should be appreciated that a receiving section 60 that tapers from the chord-wise joint 34 toward the blade root section 35 may allow the beam structure 40 to be more easily inserted and/or removed from the receiving section 60. It should be recognized that the internal width 111 of the receiving section 60 may alternatively or additionally reduce from the chord-wise joint 34 toward the blade root section 35 of the receiving section 60.

Though the varying cross-sections of the beam structure 40 and the receiving section 60 are illustrated as separate embodiments in FIGS. 7 and 10, it should be recognized that in further embodiments that both of the receiving section 60 and the beam structure 40 may include varying cross-sections to define the varying thickness 98 of the gap 92. For example, one or both of the beam structure 40 and the receiving section 60 may include varying heights 91, 110; widths 92, 111; and/or thicknesses 108, 109 of the spar caps(s) 46, 47, 48, 49.

In one embodiment, the filler material(s) 112 may be constructed, at least in part, from at least one of a foam material, a wood material, a cork material, a fiber material, a composite material, a plastic material, a polymer material, or combinations thereof. In certain embodiments, the filler material(s) 112 may be at least partially compressible in order to accommodate the relative displacement between the beam structure 40 and the receiving section 60.

In further embodiments, the shell member(s) 31, 33, 37, 39, the beam structure 40, and/or the receiving section 60 may be constructed of a thermoset resin or a thermoplastic resin. The thermoplastic materials as described herein may generally encompass a plastic material or polymer that is reversible in nature. For example, thermoplastic materials typically become pliable or moldable when heated to a certain temperature and return to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to, polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material. The thermoset material and/or the thermoplastic material described herein may also be optionally reinforced with one or more fiber material(s) including but not limited to glass fibers, carbon fibers, polymer fibers, wood fibers, bamboo fibers, ceramic fibers, nanofibers, metal fibers, or combinations thereof. In addition, the direction or orientation of the fibers may include quasi-isotropic, multi-axial, unidirectional, biaxial, triaxial, or any other suitable direction and/or combinations thereof.

Figure 11:
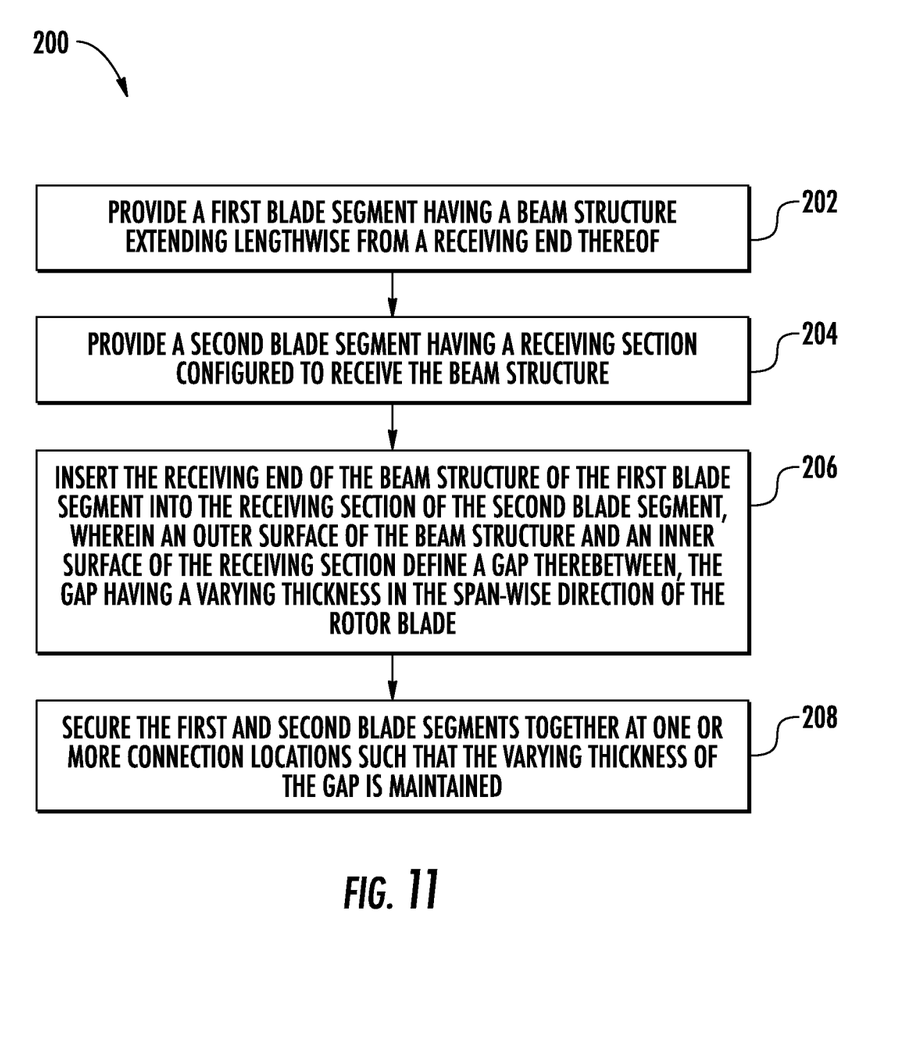

Referring now to FIG. 11, a flow chart 200 of one embodiment of a method of manufacturing a segmented rotor blade of a wind turbine according to the present disclosure is illustrated. In general, the method 200 will be described herein with reference to the first and second blade segments 30, 32, the beam structure 40, and the receiving section 60 illustrated in FIGS. 2-10. However, it should be appreciated that the disclosed method 200 may be implemented with a segmented rotor blade 28 having any other configuration. In addition, although FIG. 11 depicts steps performed in a particular order for purposes of illustration and discussion, the methods discussed herein are not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

As shown at (202), the method 200 may include providing a first blade segment 30 having a beam structure 40 extending lengthwise from a receiving end 54 thereof. As shown at (204), the method 200 may include providing a second blade segment 32 having a receiving section 60 configured to receive the beam structure 40. As shown at (206), the method 200 may include forming an inner surface 96 of the receiving section 60 and/or an outer surface 86 of the beam structure 40 with a varying cross-section. As shown at (208), the method 200 may include inserting the receiving end 54 of the beam structure 40 of the first blade segment 30 into the receiving section 60 of the second blade segment 32. Moreover, as mentioned, the outer surface 86 of the beam structure 40 and the inner surface 96 of the receiving section 60 may define a gap 92 therebetween having a varying thickness 98 in the span-wise direction of the rotor blade 28. As shown at (210), the method 200 may include securing the first and second blade segments 30, 32 together at one or more connection locations 94 such that the varying thickness 98 of the gap 92 is maintained.

The skilled artisan will recognize the interchangeability of various features from different embodiments. Similarly, the various method steps and features described, as well as other known equivalents for each such method and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
   a first blade segment and a second blade segment extending in opposite directions from a chord-wise joint, each of the first and second blade segments comprising one or more shell members and an internal support structure, the internal support structure of the first blade segment comprising a beam structure extending between a receiving end and a second end, the internal support structure of the second blade segment comprising a receiving section that receives the receiving end of the beam structure of the first blade segment; and,
   one or more connection locations where the first and second blade segments are secured together,
   wherein, when the beam structure is received within the receiving section, a gap comprising a varying thickness is defined and maintained between the beam structure and the receiving section in a span-wise direction of the rotor blade,
   wherein the one or more connection locations comprise one or more first pin joints at the receiving end of the beam structure and one or more second pin joints positioned along the beam structure toward the second end,
   wherein the varying thickness is at a minimum at the one or more connection locations, and
   wherein the varying thickness is at a maximum at a halfway point between the one or more first pin joints and the one or more second pin joints.

2. The rotor blade of claim 1, wherein the one or more first pin joints comprise at least one span-wise extending pin joint, and wherein the one or more second pin joints comprise a chord-wise extending pin joint.

3. The rotor blade of claim 1, wherein the varying thickness defines at least one of a linear transition or non-linear transition between the maximum and the minimum.

4. The rotor blade of claim 1, wherein a cross-section of the beam structure varies so as to define the varying thickness of the gap.

5. The rotor blade of claim 1, wherein the beam structure comprises one or more spar caps coupled to an inner surface of the one or more shell members of the first blade segment, wherein a thickness of the one or more spar caps is at a minimum at the one or more connection locations.

6. The rotor blade of claim 1, wherein a cross-section of the receiving section varies so as to define the varying thickness of the gap.

7. The rotor blade of claim 1, wherein a cross-section of the receiving section tapers from the chord-wise joint toward a root end thereof.

8. The rotor blade of claim 1, wherein the rotor blade further comprises a filler material at least partially filling the gap between the beam structure and the receiving section.

9. A method of manufacturing a segmented rotor blade of a wind turbine, the method comprising:
   providing a first blade segment having a beam structure extending lengthwise from a receiving end thereof, the beam structure extending between a receiving end and a second end;
   providing a second blade segment having a receiving section configured to receive the beam structure;
   forming at least one of an inner surface of the receiving section or an outer surface of the beam structure with a varying cross-section;
   inserting the receiving end of the beam structure of the first blade segment into the receiving section of the second blade segment, wherein the outer surface of the beam structure and the inner surface of the receiving section define a gap therebetween, the gap having a varying thickness in a span-wise direction of the rotor blade; and
   securing the first and second blade segments together at one or more connection locations such that the varying thickness of the gap is maintained,
   wherein the one or more connection locations comprise one or more first pin joints at the receiving end of the beam structure and one or more second pin joints positioned along the beam structure toward the second end,
   wherein the varying thickness is at a minimum at the one or more connection locations, and
   wherein the varying thickness is at a maximum at a halfway point between the one or more first pin joints and the one or more second pin joints.

10. The method of claim 9, wherein the one or more first pin joints comprise at least one span-wise extending pin joint, and wherein the one or more second pin joints comprise a chord-wise extending pin joint.

11. The method of claim 9, wherein the beam structure comprises one or more spar caps, and wherein a thickness of the one or more spar caps is at a minimum at the one or more connection locations.

12. The method of claim 9, wherein a cross-section of the receiving section tapers toward a root end of the second blade segment opposite the receiving section.

\* \* \* \* \*